(12) United States Patent
Baehrle-Miller et al.

(10) Patent No.: US 10,449,935 B2
(45) Date of Patent: Oct. 22, 2019

(54) METHOD FOR CONTROLLING A PARKING BRAKE IN A VEHICLE

(71) Applicant: Robert Bosch GmbH, Stuttgart (DE)

(72) Inventors: Frank Baehrle-Miller, Schoenaich (DE); Andreas Englert, Untergruppenbach (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 15/176,248

(22) Filed: Jun. 8, 2016

(65) Prior Publication Data

US 2016/0356330 A1 Dec. 8, 2016

(30) Foreign Application Priority Data

Jun. 8, 2015 (DE) .................... 10 2015 210 431

(51) Int. Cl.
| | | |
|---|---|---|
| *B60T 13/74* | (2006.01) | |
| *B60T 7/10* | (2006.01) | |
| *F16D 55/226* | (2006.01) | |
| *F16D 65/18* | (2006.01) | |
| *F16D 65/46* | (2006.01) | |
| *F16D 121/24* | (2012.01) | |
| *F16D 125/40* | (2012.01) | |

(52) U.S. Cl.
CPC .............. *B60T 7/107* (2013.01); *B60T 7/108* (2013.01); *B60T 13/741* (2013.01); *F16D 55/226* (2013.01); *F16D 65/183* (2013.01); *F16D 65/46* (2013.01); *F16D 2121/24* (2013.01); *F16D 2125/40* (2013.01)

(58) Field of Classification Search
CPC ...... B60T 8/00; B60T 13/741; B60T 2201/12; B60T 7/107; F16D 65/14; F16D 65/38
See application file for complete search history.

(56) References Cited

U.S. PATENT DOCUMENTS

| | | | | |
|---|---|---|---|---|
| 4,809,824 | A * | 3/1989 | Fargier ...................... | B60T 8/32 188/72.8 |
| 6,250,436 | B1 * | 6/2001 | Oikawa .................... | B60T 1/065 188/1.11 E |
| 8,397,879 | B2 * | 3/2013 | Maron .................. | B60T 13/588 188/158 |
| 2006/0025897 | A1 * | 2/2006 | Shostak ................ | B60C 23/005 701/1 |
| 2006/0108867 | A1 * | 5/2006 | Ralea ........................ | B60T 1/10 303/152 |
| 2008/0011560 | A1 * | 1/2008 | Yamaguchi ........... | B60T 13/741 188/158 |

(Continued)

FOREIGN PATENT DOCUMENTS

| | | |
|---|---|---|
| DE | 103 61 042 B3 | 5/2005 |
| DE | 10 2011 078 900 A1 | 1/2013 |

(Continued)

*Primary Examiner* — Bradley T King
*Assistant Examiner* — Mahbubur Rashid
(74) *Attorney, Agent, or Firm* — Maginot, Moore & Beck LLP

(57) ABSTRACT

In a method for controlling a parking brake in a vehicle, in order to set a clearance between the brake pad and the brake disk, a supply voltage is first applied to an electric motor, after which the supply voltage is switched off before the brake pad comes into contact with the brake disk.

9 Claims, 4 Drawing Sheets

(56) References Cited

U.S. PATENT DOCUMENTS

| | | | | |
|---|---|---|---|---|
| 2009/0099748 A1* | 4/2009 | Watanabe | ............ | B60T 13/662 |
| | | | | 701/70 |
| 2010/0193302 A1* | 8/2010 | Schumann | .............. | B60T 7/108 |
| | | | | 188/105 |
| 2010/0308645 A1* | 12/2010 | Maron | .................. | B60T 13/588 |
| | | | | 303/20 |
| 2011/0025067 A1* | 2/2011 | Cipriani | ............... | H02K 7/1823 |
| | | | | 290/52 |
| 2013/0261917 A1* | 10/2013 | Kotake | ................. | B60T 13/741 |
| | | | | 701/70 |

FOREIGN PATENT DOCUMENTS

| | | | | |
|---|---|---|---|---|
| DE | 10 2013 218 401 A1 | 3/2015 | | |
| DE | 10 2015 002 859 A1 | 8/2015 | | |
| WO | WO-2009053429 A1 * | 4/2009 | ............ | B60T 13/588 |
| WO | WO-2013118770 A1 * | 8/2013 | ................ | B60T 7/12 |
| WO | WO-2016060005 A1 * | 4/2016 | .............. | B60T 13/74 |

\* cited by examiner

METHOD FOR CONTROLLING A PARKING BRAKE IN A VEHICLE

This application claims priority under 35 U.S.C. § 119 to application no. DE 10 2015 210 431.1, filed on Jun. 8, 2015 in Germany, the disclosure of which is incorporated herein by reference in its entirety.

BACKGROUND

The disclosure relates to a method for actuating a parking brake in a vehicle.

Parking brakes in vehicles, by means of which the vehicle is held at a standstill, are known. The clamping force generated in the parking brake is generated by an electric brake motor, which axially displaces a brake piston, which is the carrier of a brake pad, in the direction of a brake disk. Such a parking brake is described, for example, in DE 103 61 042 B3.

A corresponding electromechanical parking brake is also known from DE 10 2011 078 900 A1. According to this document, the presently acting clamping force is ascertained from the motor current and the motor voltage of the electric brake motor, which current and voltage are determined in electric switching circuits laaof a control unit, which controls the electric brake motor.

SUMMARY

The method according to the disclosure relates to an electromechanical parking brake in a vehicle, comprising an electric brake motor, by means of which a clamping force that fixes the vehicle at a standstill can be generated. The rotary movement of the rotor of the electric brake motor is transferred into an axial actuating movement of a spindle, by means of which a brake piston, which is the carrier of a brake pad, is pressed axially against a brake disk.

Optionally, the parking brake is provided with an auxiliary braking device in order to also enable an auxiliary clamping force to be provided, if necessary, in addition to the electromechanical clamping force. The auxiliary braking device is the hydraulic vehicle brake, in particular, of the vehicle, the hydraulic pressure of which acts on the brake piston.

The brake motor is assigned a closed-loop or open-loop control unit for controlling the adjustable components of the parking brake, in particular for applying a supply voltage and a motor current to the brake motor.

The method according to the disclosure is intended for setting the clearance between the brake pad on the brake piston and the brake disk to a desired, reduced setpoint value, which is less than the idle travel between the starting position of the brake piston and the contact of the brake pad on the brake disk, and which can assume the value zero, if necessary, and so the brake pad rests directly on the brake disk and an at least small clamping force is generated. The clearance should be set to the setpoint value, with which the vehicle is held at a standstill, before a greater nominal clamping force is generated. The clearance remains at the setpoint value until the brake motor is actuated in order to generate a desired clamping force, in particular the nominal clamping force.

This setting of the clearance in advance to a small value, which can be zero, if necessary, has various advantages and can be carried out in different situations. Reducing the clearance reduces the lead time for building up a nominal clamping force. The brake pad is located in close proximity to the brake disk, and so no idle travel—or only a small amount of idle travel—needs to be covered until a clamping force is built up until the nominal clamping force level is reached. Therefore, the build-up of the clamping force takes place in a short amount of time. This procedure is advantageous, for example, during the automatic parking of a vehicle or on a roller dynamometer.

In the method according to the disclosure, the clearance is reduced by first acting upon the electric brake motor with its usual supply voltage, so that the brake motor is started up and the brake piston is displaced in the direction of the brake disk. The supply voltage is not maintained, however, and, in fact, the supply voltage is switched off at a switch-off time that is earlier, in particular, than the time at which the brake pad comes into contact with the brake disk. After the supply voltage is switched off, the brake piston, driven by the rotor of the brake motor, continues to move in the direction of the brake disk due to inertia and thereby reduces the clearance. Depending on the switch-off time, the brake pad is merely moved toward the brake disk, although without reaching the brake disk, or the brake pad does come into contact with the brake disk, although with a lesser force than the nominal clamping force.

It is advantageous that the supply voltage has reached its nominal level before the switch-off occurs.

Different possibilities for defining the switch-off time of the supply voltage can be considered. According to a first advantageous embodiment, the supply voltage is switched off after a fixedly predefined time period, and the switch-off time is therefore specified as a constant. The constant switch-off time is preferably selected in such a way that a clearance remains after the brake motor, in the switched-off state, has come to a stop.

According to another advantageous embodiment, the supply voltage is switched off only after the motor constant of the brake motor has been ascertained. The distance covered by the brake piston during the run-out can be ascertained on the basis of the motor constant. A starting value for the motor constant can be assumed before a present value is ascertained during the application of supply voltage to the brake motor, on the basis of which starting value the distance covered by the brake piston is ascertained first. After the motor constant has been presently calculated, this improved value can be utilized for the value of the brake piston that will be covered.

According to another advantageous embodiment, the switch-off time of the supply voltage is computationally determined on the basis of the idle travel of the brake motor. This is formed by adding the start-up distance that the brake motor covers until the idle speed is reached, the idle travel that the brake motor covers during idling, and the run-out travel that the brake motor covers during the run-out or slow-down phase in which the supply voltage is switched off. The idle travel can be computationally ascertained, wherein the switch-off time additionally depends on further characteristic parameters of the motor, inter alia, on the induced voltage of the brake motor during the run-out phase.

According to another advantageous embodiment, the brake motor is braked if a build-up of clamping force resulting from contact between the brake pad and the brake disk is detected during the slow-down or run-out of the brake motor and the clamping force exceeds a threshold value. This procedure is intended to ensure that clamping force resulting from contact occurring between the brake pad and the brake disk after the brake motor has come to a standstill is merely of a low value, which is below the threshold value. The relatively low clamping force permits, for example, operation on a roller dynamometer or maneuvering of the vehicle during a parking procedure.

The braking is carried out, for example, by controlling the brake motor in the opposite direction. Moreover, it is also possible to carry out the braking by short-circuiting a power output stage, by means of which the brake motor is controlled.

In addition, it is possible, additionally or alternatively to braking the brake motor, to control said brake motor in the opposite direction until the brake piston is moved away from the brake disk, in order to set a desired clearance or to lower the clamping force below a threshold value.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
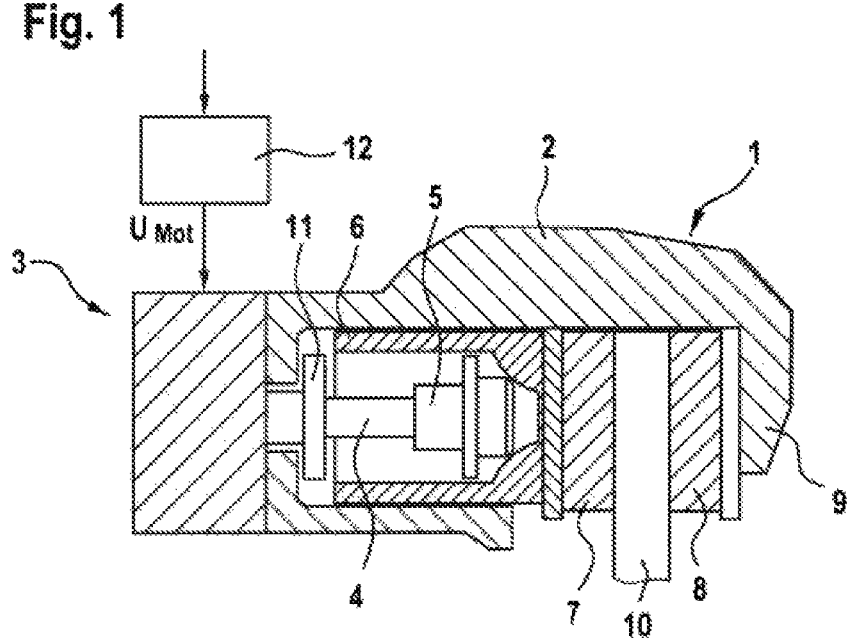
FIG. 1 shows a section through an electromechanical parking brake for a vehicle, in which the clamping force can be generated via an electric brake motor.

FIG. 1 shows an electromechanical parking brake 1 for fixing a vehicle at a standstill. The parking brake 1 comprises a brake caliper 2 having a gripping device 9, which overlaps a brake disk 10. The parking brake 1 comprises, as the actuator, a direct-current electric motor as the brake motor 3, the rotor shaft of which drives a spindle 4 in a rotating manner, on which spindle a spindle nut 5 is rotatably mounted. During a rotation of the spindle 4, the spindle nut 5 is axially displaced. The spindle nut 5 moves within a brake piston 6, which is the carrier of a brake pad 7, which brake pad is pressed against the brake disk 10 by the brake piston 6. Another brake pad 8, which is fixedly held on the gripping device 9, is located on the opposite side of the brake disk 10.

Within the brake piston 6, during a rotary motion of the spindle 4 axially forward, the spindle nut 5 can move in the direction toward the brake disk 10 and, during an opposing rotary motion of the spindle 4 axially backward, said spindle nut can move until it reaches a stop 11. In order to generate a clamping force, the spindle nut 5 acts upon the inner end face of the brake piston 6, whereby the brake piston 6—which is mounted in the parking brake 1 so as to be axially displaceable—having the brake pad 7 is pressed against the facing end face of the brake disk 10.

The brake motor 3 is controlled by a closed-loop or open-loop control unit 12, which is part of the parking brake system comprising the parking brake 1. The closed-loop or open-loop control unit 12 delivers, as the output, a supply voltage $U_{SO}$, which is applied to the electric brake motor 3.

The parking brake can be supported by a hydraulic vehicle brake, if necessary, and so the clamping force is composed of an electric-motor portion and a hydraulic portion. In the case of the hydraulic support, the back side of the brake piston 6 facing the brake motor is acted upon with pressurized hydraulic fluid.

Figure 2:
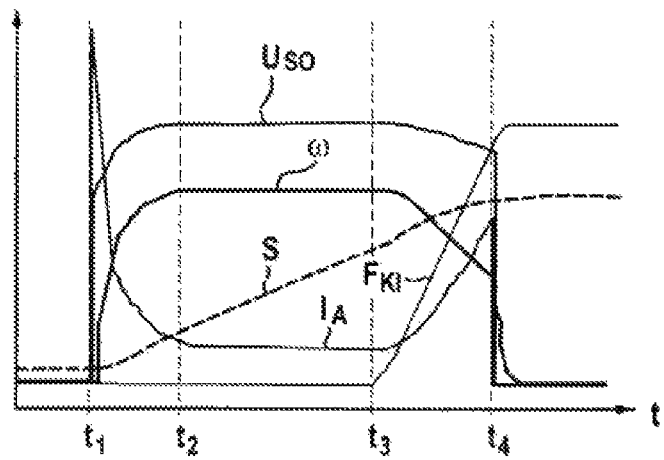
FIG. 2 shows a graph of the time-dependent progression of the supply voltage for the brake motor, the motor current, the motor speed, and the clamping force during the engagement process of the parking brake.

FIG. 2 shows a graph of the current progression $I_A$, the supply voltage $U_{SO}$, and the progression of the motor angular speed w of the electric brake motor as a function of time for an engagement process. FIG. 2 also shows a graph of the electromechanical clamping force $F_{KI}$, which is generated by the electric brake motor, and the distance s covered by the brake motor or by an actuator acted upon by the brake motor, during the engagement process.

The engagement process starts at the time t1 by way of an electrical voltage being applied and the brake motor being energized when the circuit is closed. The start phase (phase I) lasts from the time t1 to the time t2. At the time t2, the supply voltage $U_{SO}$ and the motor angular speed w have reached their maximum. The phase between t2 and t3 is the idle phase (phase II), in which the current $I_A$ moves at a maximum level. This is followed, at the time t3, by the force build-up phase (phase III) up to the time t4, in which the brake pads rest against the brake disk and are pressed against the brake disk with an increasing clamping force $F_{KI}$. At the time t4, the electric brake motor is switched off by opening the electric circuit, and so, as the progression continues, the angular speed w of the brake motor drops to zero.

The force-increase point coincides with the phase of the force build-up at the time t3. The force build-up or the progression of the clamping force $F_{KI}$ can be determined, for example, on the basis of the progression of the current $I_A$ of the brake motor, which has the same progression, in principle, as the electromechanical clamping force $F_{KI}$. Proceeding from the low level during the idle phase between t2 and t3, the current progression $I_A$ increases steeply at the beginning of the time t3. This increase in the current can be detected and utilized for determining the force-increase point. In principle, the progression of the force build-up can also be determined from the progression of the voltage or the speed, or from any combination of the signals for the current, voltage, and speed.

Figure 3:
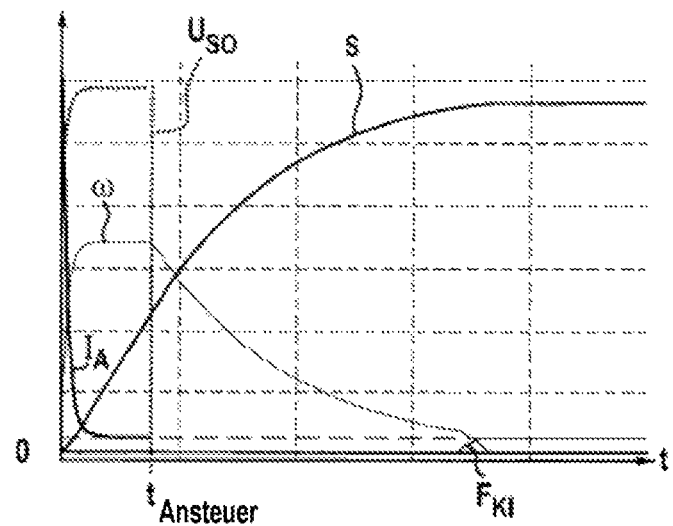
FIG. 3 shows a graph of the shapes of the curves during the switch-off of the supply voltage.

The graph according to FIG. 3 also shows the progression over time of the supply voltage $U_{SO}$, the distance s covered, the motor angular speed to, the motor current $I_A$, and the clamping force $F_{KI}$, although the supply voltage $U_{SO}$ is maintained only up to a time $t_{Ansteuer}$, after which the supply voltage $U_{SO}$ is switched off. At this time, the supply voltage $U_{SO}$ has reached its nominal level, the motor speed is at an idle level. The brake pad on the brake piston is still spaced from the brake disk, and therefore no clamping force $F_{KI}$ has been built up yet, either.

When the supply voltage $U_{SO}$ is switched off, said supply voltage returns to the value zero, while the rotor shaft of the electric brake motor continues to rotate, due to inertia, and therefore the distance s covered continues to increase while, simultaneously, the angular speed to decreases. When contact between the brake pad and the brake disk is achieved, the clamping force $F_{KI}$ increases to a value greater than zero.

This procedure is intended for setting the clearance, i.e., the spacing between the brake pad and the brake disk, to a reduced value before the actual engagement process of the parking brake, wherein the clearance can be reduced to zero, if necessary. In the latter case, however, the resultant clamping force $F_{KI}$ should be below a clamping force threshold value.

The switch-off time $t_{Ansteuer}$ of the supply voltage $U_{S0}$ can be defined in different ways. According to a first variant embodiment, the switch-off time $t_{Ansteuer}$ is a fixedly predefined time. This time is advantageously selected in such a way that, first, the supply voltage $U_{S0}$ and the motor angular velocity co have reached their stationary values, but the clearance is largely or completely reduced when the supply voltage $U_{S0}$ is switched off and the brake motor runs out or slows down. Depending on the clearance desired, the brake motor can be reactivated after completion of the run-out or in the end phase of the run-out and can be acted upon with supply voltage, specifically either in the direction of the brake disk or in the opposite direction.

Figure 4:
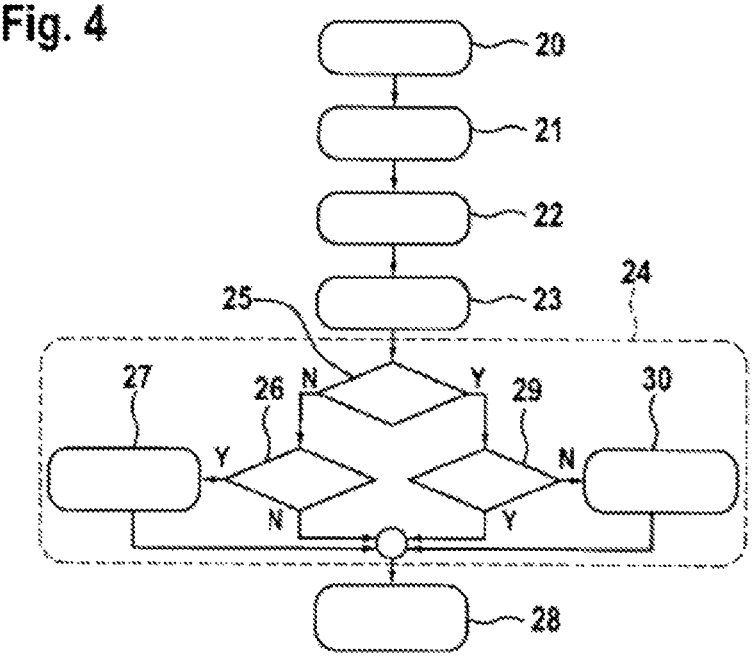
FIG. 4 shows a block diagram having process steps for setting the clearance between the brake pad and the brake disk, depicted for a switch-off of the supply voltage after a fixedly predefined time period.

FIG. 4 shows a block diagram for setting a desired clearance in the parking brake using a fixedly predefined switch-off time $t_{Ansteuer}$. In a first block 20, the engagement process in the parking brake is started first by way of the supply voltage $U_{S0}$ being applied to the electric brake motor. The idle speed has been reached in the following method step 21. In the next method step 22, the supply voltage $U_{S0}$ is switched off after the switch-off time $t_{Ansteuer}$ has been reached, after which the brake motor enters the run-out mode. In the method step 23, the run-out of the brake motor has ended, and the spindle nut having the brake piston and brake pad has come to a standstill.

This is followed by a monitoring block 24 having different queries related to a desired clamping force $F_{KI}$ in the standstill-state of the brake motor. In the query block 24, an initial query is carried out in step 25 to determine whether a clamping force $F_{KI}$ was built up while the brake motor was at a standstill, which can be detected, for example, on the basis of the motor current. If this is not the case, the brake pad is spaced from the brake disk, and there is clearance. In this case, the "no" branch ("N") is followed to the next method step 26, in which a query is carried out as to whether a clamping force build-up is desired. If so, the "yes" branch ("Y") is followed to the method step 27, according to which the brake motor is briefly controlled in the engagement direction in order to overcome the clearance and bring the brake pad into contact with the brake disk, and so an at least small clamping force is built up. In the subsequent step 28, the method for setting the clearance is now ended.

However, if the result of the query in step 26 is that a build-up of clamping force is not desired, the "no" branch is followed directly to step 28, to end the setting of the clearance.

If the result of the query in the method step 25 as to whether a clamping force has actually been built-up, the "yes" branch is followed to the step 29, where a query is carried out as to whether the build-up of clamping force is also desired. If so, the "yes" branch is followed to the step 28, to end the method. Otherwise, the "no" branch is followed to step 30, in which the brake motor is briefly controlled in the opposite direction for disengagement, and so the brake pad is moved away from the brake disk and the clamping force is reduced back to zero. Next, the method is ended according to step 28.

In one variant embodiment, the switch-off time $t_{Ansteuer}$ is not fixedly predefined, but rather the supply voltage is switched off only after the motor constant $k_M$ of the brake motor in the ongoing method has been estimated. With consideration for the motor constant $k_M$, the distance $x(t)$ covered by the spindle nut or the brake piston having the brake pad—which nut is driven by the slowing-down rotor shaft of the brake motor—can calculate in the run-out mode, with the supply voltage $U_{S0}$ switched off:

$$w(t) = \frac{1}{k_M} \cdot u_{EMK}(t)$$

$$x(t) = \frac{s_{SP}}{k_M * 2 * \pi * i_{Getr}} * \int u_{EMK}(t) dt$$

In this case, $U_{EMK}$ stands for the voltage induced in the run-out of the brake motor, $s_{SP}$ is the thread pitch required to convert the rotary motion of a spindle into a translatory motion of the spindle nut and, therefore, of the brake piston and the brake pad, wherein the spindle is driven by the rotor shaft of the brake motor. The parameter $i_{Getr}$ represents all the gear stages that bring about a gear ratio between the rotor shaft of the brake motor and the spindle. The induced voltage $U_{EMK}$ can be measured.

If the distance covered in the run-out mode is known, it is possible to actively intervene, if necessary, by accelerating or braking the brake motor, for example, by correspondingly switching a control logic.

Figure 5:
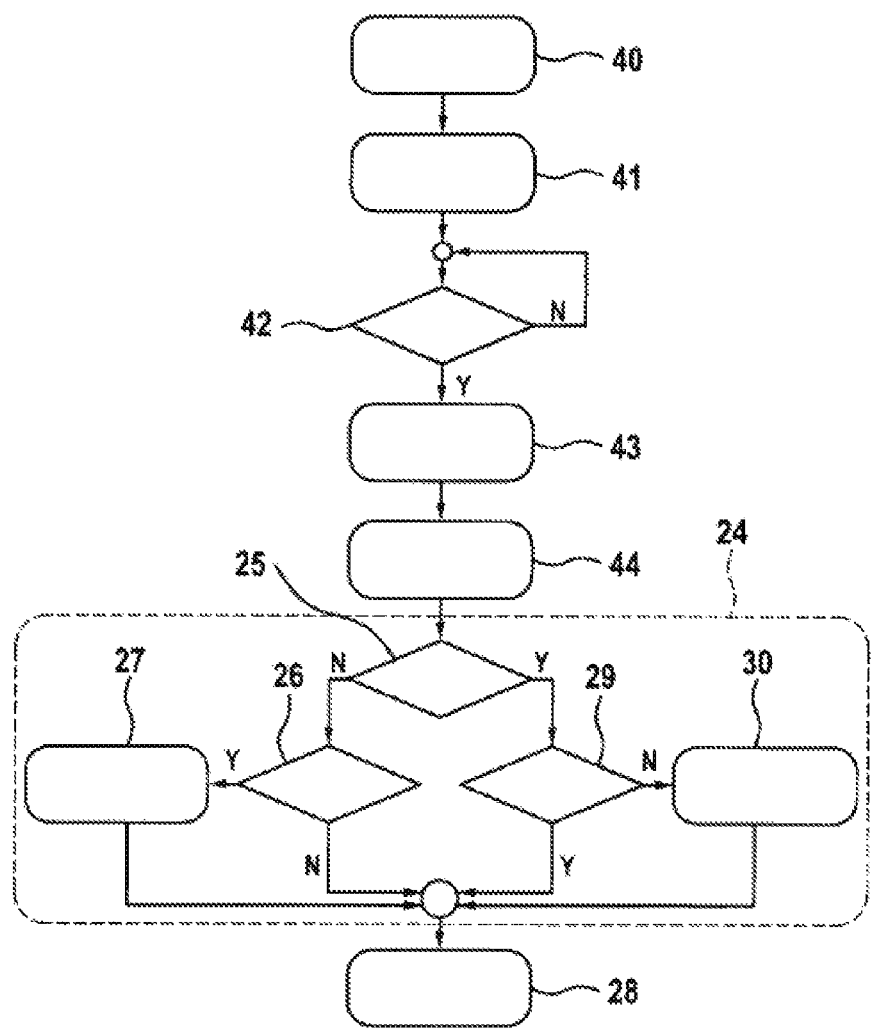
FIG. 5 shows a block diagram for setting the clearance in an alternative embodiment, in which the supply voltage is switched off only after the motor constant of the brake motor has been ascertained.

The associated block diagram is shown in FIG. 5. The only difference from the block diagram according to FIG. 4 is in the method steps 40 to 44, which are adjoined by the monitoring block 24, which is identical to that from FIG. 4.

According to the first method step 40, first the engagement process of the parking brake is started by applying the supply voltage $U_{S0}$ until the idle speed is reached in the next step 41. Subsequently, a query is carried out in the method step 42 as to whether the motor constant $k_M$ has already been calculated in the on-going method. If not, the "no" branch is followed back to the beginning of the method 42 and the query is carried out again at cyclic intervals.

If the motor parameter $k_M$ is already available, however, the "yes" branch is followed to the next step 43, according to which the supply voltage $U_{S0}$ is switched off and the brake mode is transferred into the run-out mode. In the step 44, the brake motor has come to a standstill. This is followed by the monitoring block 24, in which a check is carried out to determine whether a clamping force was built up and a clamping force is desired, after which the motor is briefly controlled in the engagement direction or in the disengagement direction, if necessary.

In another variant embodiment, the switch-off time $t_{Ansteuer}$ of the supply voltage $U_{S0}$ is determined on the basis of idle travel $x_{Leerweg}$, which is calculated, as follows, via addition $$x_{Leerweg} = x_{Anlauf} + x_{Leerlauf} + x_{Auslauf}$$

of the components $x_{Anlauf}$, $x_{Leerlauf}$ and $X_{Anstauf}$. $x_{Anlauf}$ in this case stands for the distance that the spindle nut or the brake piston covers after the application of the supply voltage until the idle speed of the motor is reached. $x_{Leerlauf}$ stands for the distance that the spindle nut or the brake piston covers during the idling of the motor, and $x_{Auslauf}$ stands for the distance that the spindle nut or the brake piston cover after the switch-off of the supply voltage $U_{S0}$ in the slow-down or run-out phase. $x_{Anlauf}$, $x_{Leerlauf}$ and $x_{Auslauf}$ can be ascertained from $$x_{Anlauf} = \frac{s_{SP}}{k_M * 2 * \pi * i_{Getr}} * \int_0^{t_{LeerlaufBeginn}} [u_S(t) - R_{ges} * I_A(t)] dt$$

-continued $$x_{Leerlauf} = \frac{s_{SP}}{k_M * 2 * \pi * i_{Getr}} * [u_{S0} - R_{ges} * I_0] * t_{Ansteuer}$$

$$x_{Auslauf} = \frac{s_{SP}}{k_M * 2 * \pi * i_{Getr}} * \int_{0_{Auslauf_{Anfang}}}^{t_{Auslauf_{Ende}}} u_{EMK}(t) \, dt$$

with consideration for the sampled motor current $I_A$ during the start-up phase, the total resistance of the motor $R_{ges}$, the idle current $I_0$ during the idle phase, and the induced voltage $U_{EMK}$ during the slow-down phase. On the basis thereof and with reference to the following $$t_{Ansteuer} = \frac{\frac{x_{Leerweg} * k_M * 2 * \pi * i_{Getr}}{s_{SP}}}{U_{S0}(t) - R_{ges} * I_{A0}(t)} - \frac{\int_0^{t_{Leerlauf_{Beginn}}} [u_S(t) - R_{ges} * t_A(t)] \, dt - \int_{t_{Auslauf_{Anfang}}}^{t_{Auslauf_{Ende}}} u_{EMK}(t) * dt}{U_{S0}(t) - R_{ges} * I_{A0}(t)}$$

the switch-off time $t_{Ansteuer}$ for a desired clearance can be precisely determined, which clearance represents the difference between the idle travel $x_{Leerweg}$, which was computationally determined, of the specific situation and the actual idle travel.

Figure 6:
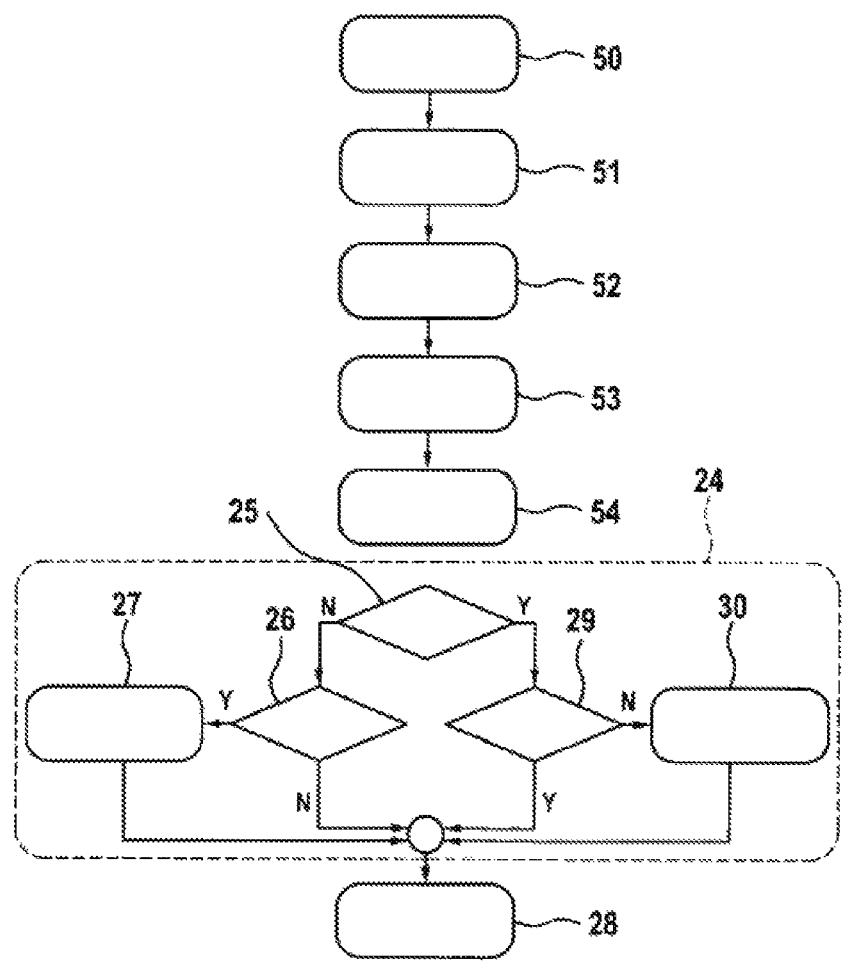
FIG. 6 shows a further block diagram for setting the clearance, in which the switch-off time of the supply voltage is computationally determined on the basis of the idle travel of the brake motor.

The associated block diagram is shown in FIG. 6. In the first method step 50, the engagement process of the parking brake is started again until the idle speed is reached in step 51. Subsequently, in step 52, the calculation of $x_{Anlauf}$, $x_{Leerlauf}$ and $x_{Auslauf}$ is carried out, on the basis of which the switch-off time $t_{Ansteuer}$ can be ascertained. In the step 53, the supply voltage is switched off at the switch-off time $t_{Ansteuer}$ and in step 54 the spindle nut or the brake piston comes to a standstill.

This is followed, as in FIGS. 4 and 5, by the query or monitoring block 24 with a query of the clamping force and, if necessary, a control of the brake motor in the engagement or disengagement direction.

What is claimed is:

1. A method for controlling a parking brake in a vehicle, the parking brake including an electromechanical braking device having an electric brake motor configured to displace a brake pad on a brake piston in a direction of a brake disk, the method comprising:
   applying a supply voltage to the electric brake motor to set the brake pad in motion in the direction of the brake disk from a starting position; and
   after applying the supply voltage, switching off the supply voltage to the electric brake motor in response to the supply voltage having been applied to the electric brake motor for a predefined time period and before the brake pad comes into contact with the brake disk, the brake pad being allowed to continue to move in the direction of the brake disk after switching off the supply voltage.

2. The method according to claim 1 further comprising:
   determining a distance traveled by the brake pad in the direction of the brake disk from the starting position based on the motor constant of the electric brake motor.

3. The method according to claim 1 further comprising:
   after switching off the supply voltage, detecting whether there is a clamping force between the brake pad and the brake disk; and
   slowing a rotation of the electric brake motor in response to the clamping force being detected and the clamping force exceeding a threshold value.

4. The method according to claim 3, the slowing the rotation of the electric brake motor further comprising:
   slowing the rotation of the electric brake motor by controlling the electric brake motor to rotate in a direction opposite a current rotating direction of the electric brake motor.

5. The method according to claim 3, the slowing the rotation of the electric brake motor further comprising:
   slowing the rotation of the electric brake motor by short-circuiting a power output stage of the electric brake motor.

6. The method according to claim 1, wherein the applying the supply voltage and the switching off the supply voltage are performed one of (i) before an automated parking procedure and (ii) during the automated parking procedure.

7. The method according to claim 1, wherein the applying the supply voltage and the switching off the supply voltage are performed one of (i) before an operation of the vehicle on a roller dynamometer and (ii) during the operation of the vehicle on a roller dynamometer.

8. A control unit for controlling a parking brake in a vehicle, the parking brake including an electromechanical braking device having an electric brake motor configured to displace a brake pad on a brake piston in a direction of a brake disk, the control unit being one of closed-loop and open-loop, the control unit comprising:
   a processor configured to:
      apply a supply voltage to the electric brake motor to set the brake pad in motion in the direction of the brake disk from a starting position;
      determine a motor constant of the electric brake motor while the brake pad moves in the direction of the brake disk; and
      after applying the supply voltage, switch off the supply voltage to the electric brake motor after the motor constant of the brake motor is ascertained and before the brake pad comes into contact with the brake disk, the brake pad being allowed to continue to move in the direction of the brake disk after switching off the supply voltage.

9. A parking brake in a vehicle, the parking brake comprising:
   an electromechanical braking device having an electric brake motor configured to displace a brake pad on a brake piston in a direction of a brake disk; and
   control unit, the control unit being one of closed-loop and open-loop, the control unit being configured to:
      apply a supply voltage to the electric brake motor to set the brake pad in motion in the direction of the brake disk from a starting position;
      determine a switch-off time based on the supply voltage, a measured motor current of the electric brake motor, and a desired distance to be set between the brake pad and the brake; and
      after applying the supply voltage, switch off the supply voltage to the electric brake motor at the switch off time before the brake pad comes into contact with the brake disk, the brake pad being allowed to continue to move in the direction of the brake disk after switching off the supply voltage.

* * * * *